(12) United States Patent
Sheng et al.

(10) Patent No.: US 7,654,527 B2
(45) Date of Patent: Feb. 2, 2010

(54) METHOD OF TRANSPORTING AND PROCESSING DOCUMENTS

(75) Inventors: Thomas Sheng, Hsinchu (TW); Chi-Yao Chen, Nanjhuang Township, Miaoli County (TW)

(73) Assignee: Avision Inc. (TW)

( * ) Notice: Subject to any disclaimer, the term of this patent is extended or adjusted under 35 U.S.C. 154(b) by 361 days.

(21) Appl. No.: 11/517,319

(22) Filed: Sep. 8, 2006

(65) Prior Publication Data

US 2007/0063414 A1    Mar. 22, 2007

(30) Foreign Application Priority Data

Sep. 16, 2005    (TW) ............................... 94131963 A

(51) Int. Cl.
*B65H 5/02* (2006.01)

(52) U.S. Cl. ...................... 271/270; 271/272; 271/3.14; 271/4.01

(58) Field of Classification Search ................. 271/270, 271/272, 3.14, 4.01, 4.07, 4.08, 3.06, 3.09, 271/3.17; 399/368, 371, 367
See application file for complete search history.

(56) References Cited

U.S. PATENT DOCUMENTS

| | | | | |
|---|---|---|---|---|
| 4,535,982 A | * | 8/1985 | Mochimaru | 271/127 |
| 4,775,139 A | * | 10/1988 | Honjo et al. | 271/10.03 |
| 6,206,359 B1 | * | 3/2001 | Hirota et al. | 271/3.15 |
| 2003/0086720 A1 | * | 5/2003 | Song | 399/81 |
| 2005/0191065 A1 | * | 9/2005 | Sawanaka et al. | 399/16 |

* cited by examiner

*Primary Examiner*—Patrick H Mackey
*Assistant Examiner*—Ernesto Suarez

(57) ABSTRACT

A method includes the steps of rotating an input roller to transport a first leading edge of a first document from an input tray to an input passageway, a scanning position and an output passageway sequentially; rotating the input roller to transport a second leading edge of a second document from the input tray to the input passageway after a first trailing edge of the first document deviates from the input roller; rotating an output roller to transport the first leading edge from the output passageway to an output tray; and generating a linear speed difference between the input roller and the output roller, after the first trailing edge deviates from the scanning position, to transport the first trailing edge to the output tray, such that the second leading edge is still within the input passageway or the input tray when the first trailing edge deviates from the output roller.

19 Claims, 3 Drawing Sheets

METHOD OF TRANSPORTING AND PROCESSING DOCUMENTS

BACKGROUND OF THE INVENTION

1. Field of the Invention

The invention relates to a document transporting and processing method, and more particularly to a document transporting and processing method of facilitating the inspection of a scanned result.

2. Description of the Related Art

An automatic document feeder is frequently used in conjunction with an image input/output device and is capable of transporting, one by one, the documents into the image input/output device. In a scanner equipped with an automatic document feeder, for example, a stack of documents on the automatic document feeder can be transported, one by one, to a scanning region of the scanner where an image of the document may be acquired.

In order to shorten the time interval between two times of transporting the adjacent documents, the two or more than two documents may simultaneously exist in a transporting path because the two documents are transported one by one with a specific distance therebetween in the automatic document feeder.

When a trailing edge of the current document is scanned, it is an optimum standby condition that a leading edge of the next document is located at the scanning position. However, the current document does not completely deviate from the automatic document feeder. So, the current document may be continuously transported to deviate from the automatic document feeder as the next document is being scanned.

If a user cancels the procedure of scanning the stack of documents by, for example, operating the software, the document which is not scanned yet in the sheet passageway can be taken out easily after an upper cover of the document feeder is opened.

However, the document which has been transported across the scanning position still remains in the sheet passageway and is clamped between two rollers. So, the document cannot be pulled out until the rollers are rotated, or the suitable force has to be applied to pull the document out. However, one of the rollers clamping the document is connected to a motor directly through a gear set. When the document is being pulled out, the motor has to be rotated. So, the damping of the motor is enlarged by the decelerating gear set, and the document cannot be easily pulled out or tends to be torn.

When this automatic document feeder is used in a scan-and-check mode, in which the user hopes to check the scanned image of the document immediately after the document is scanned in a specific occasion, for example, the user usually places a stack of documents in the input tray and then controls the automatic document feeder to transport the documents and controls the scanning module to scan the documents through a software interface or a hardware key. The first document still remains in the sheet passageway after being scanned. At this time, the second document following the first document is also transported to the sheet passageway to save the time of transporting the second document. Because the first document has to be taken out for the purpose of comparing the scanned image with the first document, the rollers have to be rotated to eject the first document. However, ejecting the first document may transport the second document over the scanning position. So, the second document has to be reversed again such that the scanning module can perform a next scan. Thus, the prior art design is poor and inconvenient.

SUMMARY OF THE INVENTION

It is therefore an object of the invention to provide a document transporting and processing method, which decelerates or stops a second document while ejecting a first document to keep the second document in front of a scanning position such that the second document can be scanned in the next time.

To achieve the above-identified object, the invention provides a document transporting and processing method used in an automatic document feeding mechanism of an image acquiring device. The automatic document feeding mechanism has an input tray, an input roller, an input passageway, an output passageway, an output roller, a scanning position and an output tray. The method includes the steps of: (a) rotating the input roller to transport a leading edge of a first document from the input tray to the input passageway, the scanning position and the output passageway sequentially; (b) rotating the input roller to transport a leading edge of a second document from the input tray to the input passageway after a trailing edge of the first document deviates from the input roller; (c) rotating the output roller to transport the leading edge of the first document from the output passageway to the output tray; and (d) continuously rotating the output roller, after the trailing edge of the first document deviates from the scanning position, to transport the trailing edge of the first document to the output tray, generating a linear speed difference between the input roller and the output roller to generate a transporting speed difference between the first document and the second document and transporting the leading edge of the second document to the scanning position after the trailing edge of the first document deviates from the output roller.

It is to be noted that the above-mentioned procedures may also include the following condition. Before the first document is transported to the output tray, the leading edge of the second document will not enter the input passageway but still remains in the input tray. At this time, the input roller can be automatically rotated immediately after the first document deviates from the output roller such that the second document can enter the input passageway. Alternatively, the input roller cannot be rotated until an instruction is made.

When the first document is being transported across the scanning position, a scanning module may be enabled to scan the first document such that the user can compare the content of the first document with the scanned image, and then the second document may be scanned.

DETAILED DESCRIPTION OF THE INVENTION

Figure 1:
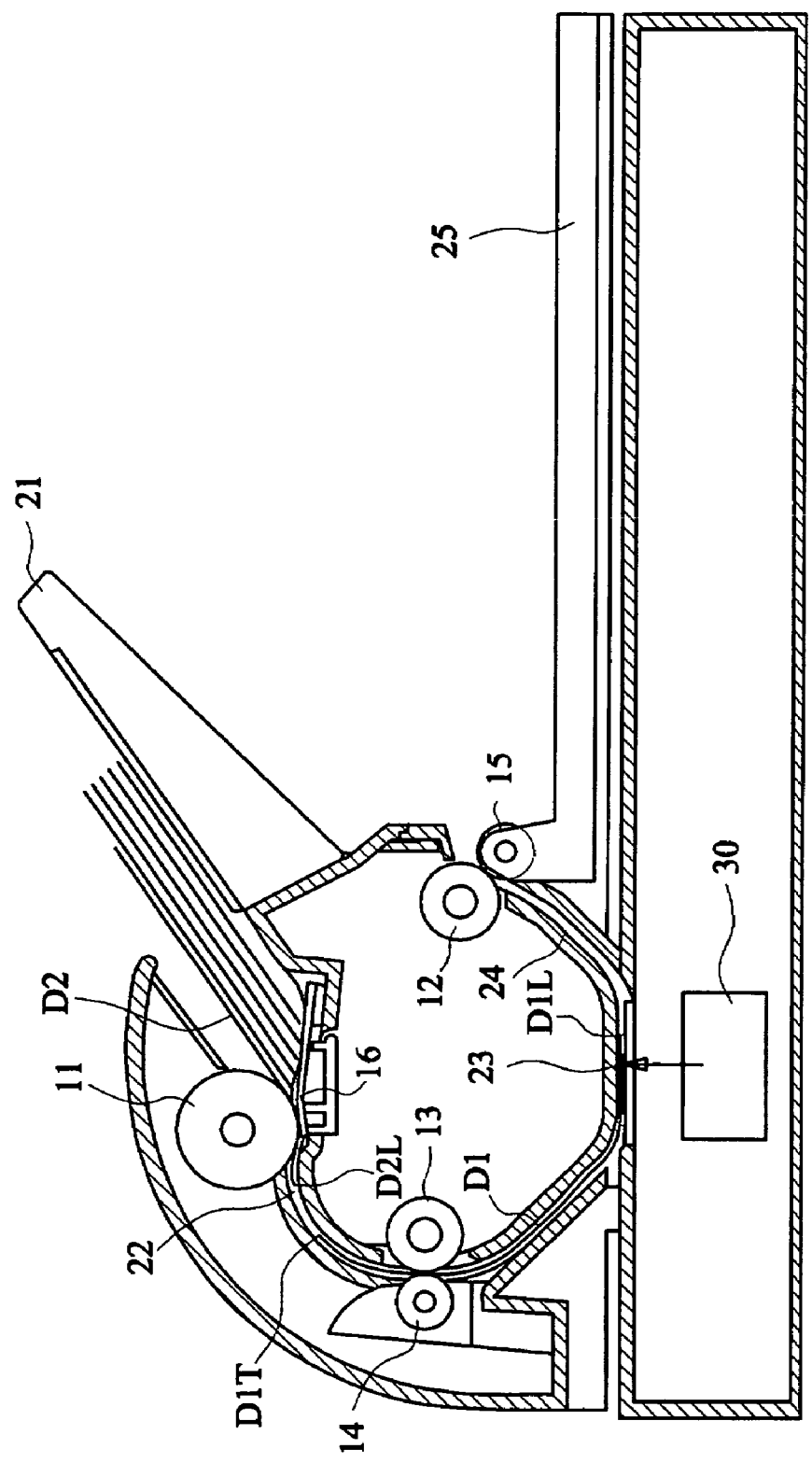
FIG. 1 shows a first state of a document transporting device in a document transporting method of the invention.
Figure 2:
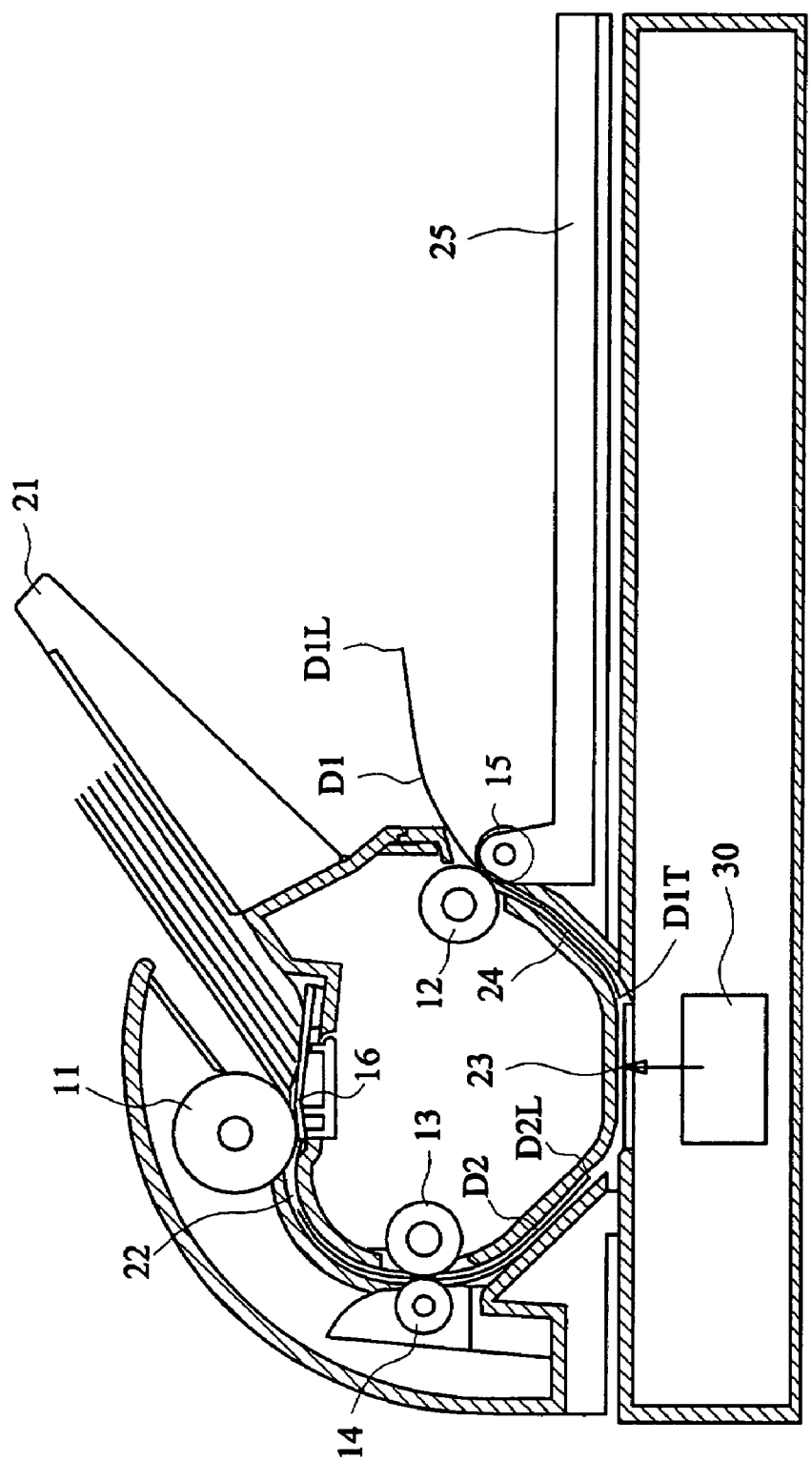
FIG. 2 shows a second state of the document transporting device in the document transporting method of the invention.
Figure 3:
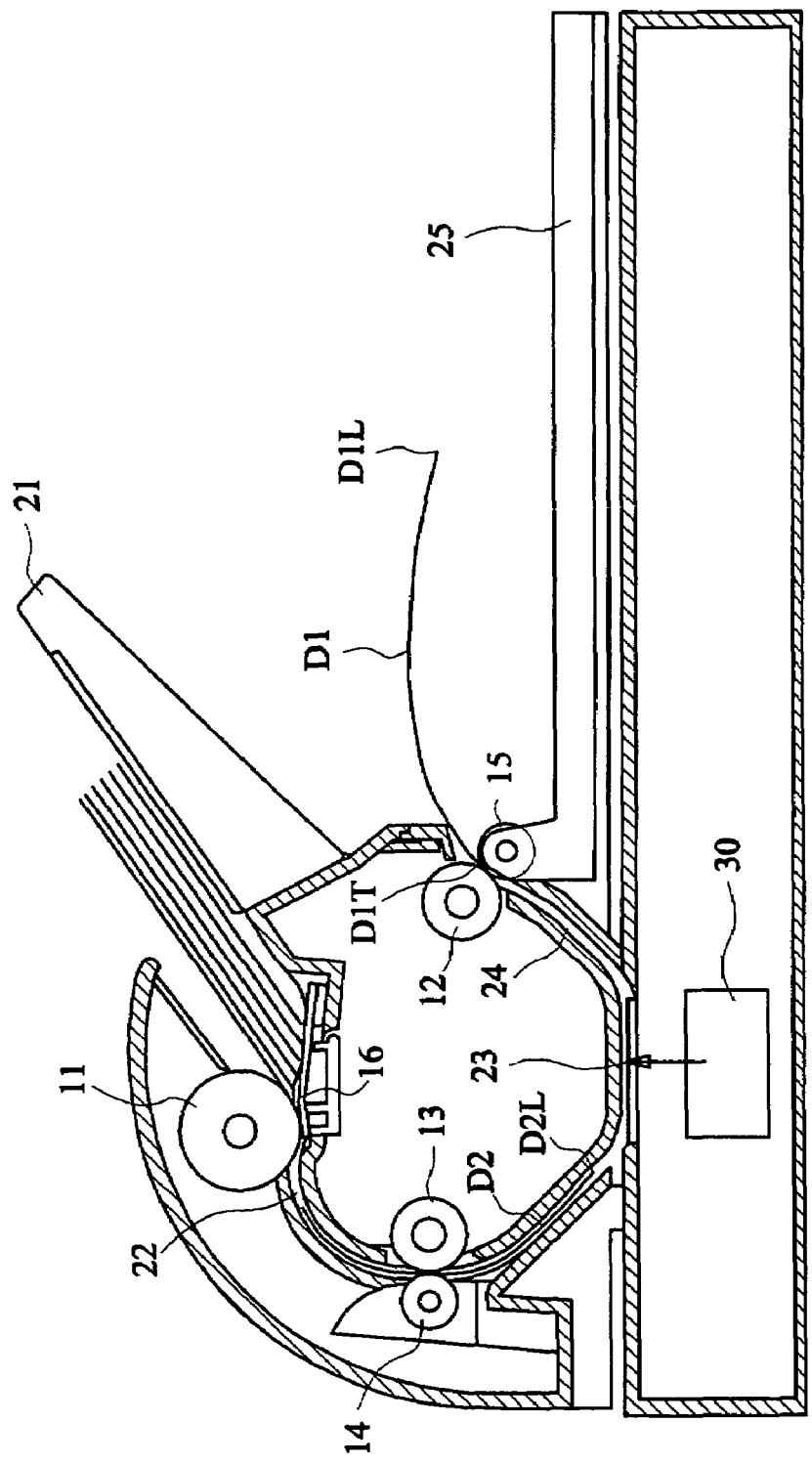
FIG. 3 shows a third state of the document transporting device in the document transporting method of the invention.

FIGS. 1 to 3 show three states of a document transporting device in a document transporting method of the invention. As shown in FIGS. 1 to 3, the document transporting and processing device using the document transporting and processing method of the invention may be a stand-alone automatic document feeder, a stand-alone sheet-fed scanner or a device integrating an automatic document feeder and a flatbed scanner. The document transporting and processing method of this embodiment will be described in the following.

First, an input roller 11 is rotated to transport a leading edge D1L of a first document D1 from an input tray 21 to an input passageway 22, a scanning position 23 and an output passageway 24 sequentially, as shown in FIG. 1. In this embodiment, the scanning position 23 includes, without limitation to, the position for the scanning of the document. In this step, a scanning module 30 may be enabled to scan the first document D1, which is being transported across the scanning position 23. In addition, in order to control a first document and a second document to move in the input passageway more stably, an auxiliary roller 13 on the input passageway 22 may further be rotated to assist the input roller 11 in transporting a leading edge D2L of a second document D2 from the input passageway 22 to the scanning position 23. The auxiliary roller 13 contacts an idle roller 14 to transport the first document D1 and the second document D2.

After a trailing edge D1T of the first document D1 deviates from the input roller 11, the input roller 11 is rotated to transport the leading edge D2L of the second document D2 from the input tray 21 to the input passageway 22, as shown in FIG. 1. In this embodiment, the input roller 11 contacts a friction pad 16 to separate the first document D1 from the second document D2.

Then, an output roller 12 is rotated to transport the leading edge D1L of the first document D1 from the output passageway 24 to an output tray 25, as shown in FIG. 2. It is to be noted that the input roller 11, the auxiliary roller 13 and the output roller 12 may be driven by the same power source and thus rotated synchronously, or independently driven by the different power sources. In this embodiment, the output roller 12 contacts an idle roller 15 to transport the first document D1.

Next, after the trailing edge D1T of the first document D1 deviates from the scanning position 23, the output roller 12 is continuously rotated to generate a linear speed difference between the input roller 11 and the output roller 12 and to generate a transporting speed difference between the first document D1 and the second document D2 such that the trailing edge D1T of the first document D1 is transported to the output tray 25, as shown in FIG. 3. Consequently, when the trailing edge D1T of the first document D1 deviates from the output roller 12, the leading edge D2L of the second document D2 is still within the input passageway 22 or the input tray 21, or, in other words, is in front of the scanning position 23 or in the left-hand side of the scanning position 23. When the leading edge D2L of the second document D2 is still within the input tray 21, it means that the second document D2 is not transported until the first document D1 is transported completely.

The linear speed difference may be generated by decelerating or stopping the input roller 11. In this case, the timing of decelerating the input roller 11 may have various changes. For example, the input roller 11 and/or the auxiliary roller 13 may be slowed down immediately and eventually stopped after the trailing edge D1T of the first document D1 deviates from the scanning position 23. Alternatively, the input roller 11 and/or the auxiliary roller 13 may also be slowed down immediately and eventually stopped after the trailing edge D1T of the first document D1 deviates from the scanning position 23 for a predetermined time period. That is, the second document D2 still may be transported by a distance. The method may also include the following condition. Before the first document D1 is transported to the output tray 25, the leading edge D2L of the second document D2 will not enter the input passageway 22 but still remains in the input tray 21. That is, the input roller 11 is continuously held stationary. At this time, the input roller 11 may be automatically rotated immediately after the first document D1 deviates from the output roller 12 according to the requirement such that the second document D2 can enter the input passageway 22. Alternatively, the input roller 11 cannot be rotated until an instruction is made. Thus, the input roller 11 is again rotated according to the instruction and the second document D2 is transported to the scanning position 23 after the input roller 11 is stopped. Consequently, the leading edge D2L of the second document D2 is transported to the scanning position 23 after the trailing edge D1T of the first document D1 deviates from the output roller 12.

The explanation will be made by taking the scanning of a stack of checks as an example. According to the above-mentioned method of the invention, the stack of checks may be placed in the input tray 21. Then, a first check is transported and scanned. After the scanning of the first check, the first check is caused to eject from the output roller 12 while a second check is transported into the input passageway 22 but not across the scanning position 23. Next, the user can compare the check with the scanned image on the computer display to determine whether the scanned image meets his/her requirement. In other words, the computer display is enabled to display the scanned image generated by the scanning module, wherein the scanned image is displayed after the first document is ejected from the output roller and before the second document is transported across the scanning position. If yes, the second check may be scanned under the control of the keyboard or button or after a predetermined time interval. Because the second check has been located in the input passageway 22, it is unnecessary to spend time to transport the second check into the input passageway 22. Alternatively, the user may continuously compare the check with the scanned image, and terminate the scanning procedure when he or she finds some problem. In another method, the user has to verify the scanned image of each check. Thus, the second check cannot enter the input passageway but still remains in the input tray before the first check is verified and the user makes the instruction, which is also referred to as an initiating instruction generated according to a user input received by the image acquiring device. Thus, the invention provides a very simple operating method for the user who needs to compare the original with the scanned image of the original.

Alternatively, the linear speed difference may be generated by accelerating the output roller 12, or by decelerating the input roller 11 and accelerating the output roller 12. In addition, a clutch may be adopted to cause the linear speed difference.

While the invention has been described by way of examples and in terms of a preferred embodiment, it is to be understood that the invention is not limited thereto. To the contrary, it is intended to cover various modifications. Therefore, the scope of the appended claims should be accorded the broadest interpretation so as to encompass all such modifications.

What is claimed is:

1. A document transporting and processing method used in an automatic document feeding mechanism of an image acquiring device, the automatic document feeding mechanism having an input tray, an input roller, an input passageway, an output passageway, an output roller, a scanning position and an output tray, the method comprising the steps of:

(a) rotating the input roller to transport a leading edge of a first document from the input tray to the input passageway, the scanning position and the output passageway sequentially;

(b) rotating the input roller to transport a leading edge of a second document from the input tray to the input passageway after a trailing edge of the first document deviates from the input roller;

(c) rotating the output roller to transport the leading edge of the first document from the output passageway to the output tray, wherein the input roller and the output roller synchronously rotate in the steps (a) and (c); and (d) continuously rotating the output roller, after the trailing edge of the first document deviates from the scanning position, to transport the trailing edge of the first document to the output tray, generating a linear speed difference between the input roller and the output roller to generate a transporting speed difference between the first document and the second document and receiving a user input to generate an initiating instruction, and thus transporting the leading edge of the second document to the scanning position after the trailing edge of the first document deviates from the output roller according to the initiating instruction.

2. The method according to claim 1, wherein the step (a) comprises:
enabling a scanning module to scan the first document, which is being transported across the scanning position.

3. The method according to claim 1, wherein the input roller stops rotating immediately after the trailing edge of the first document deviates from the scanning position in the step (d).

4. The method according to claim 1, wherein the input roller stops rotating after the trailing edge of the first document deviates from the scanning position for a predetermined time period in the step (d).

5. The method according to claim 1, wherein the input roller contacts a friction pad to separate the first document from the second document.

6. The method according to claim 1, wherein the output roller contacts an idle roller to transport the first document.

7. The method according to claim 1, wherein the step (a) comprises:
rotating an auxiliary roller on the input passageway to assist the input roller in transporting the leading edge of the second document from the input passageway to the scanning position.

8. The method according to claim 7, wherein the step (a) further comprises:
enabling a scanning module to scan the first document transported across the scanning position.

9. The method according to claim 7, wherein the input roller, the auxiliary roller and the output roller synchronously rotate in the steps (a) and (c).

10. The method according to claim 7, wherein the input roller and the auxiliary roller stop rotating immediately after the trailing edge of the first document deviates from the scanning position in the step (d).

11. The method according to claim 7, wherein the input roller and the auxiliary roller stop rotating after the trailing edge of the first document deviates from the scanning position for a predetermined time period in the step (d).

12. The method according to claim 7, wherein the input roller contacts a friction pad to separate the first document from the second document.

13. The method according to claim 7, wherein the output roller contacts an idle roller to transport the first document.

14. The method according to claim 7, wherein the auxiliary roller contacts an idle roller to transport the first document and the second document.

15. The method according to claim 1, wherein the linear speed difference is generated by decelerating the input roller.

16. The method according to claim 1, wherein the linear speed difference is generated by stopping the input roller.

17. The method according to claim 1, wherein the linear speed difference is generated by accelerating the output roller.

18. The method according to claim 1, wherein the linear speed difference is generated by decelerating the input roller and accelerating the output roller.

19. The method according to claim 2, wherein the step (a) further comprises:
enabling a computer display to display a scanned image generated by the scanning module, wherein the scanned image is displayed after the first document is ejected from the output roller and before the second document is transported across the scanning position.

* * * * *